United States Patent [19]
Sartor, Jr.

[11] Patent Number: 5,416,573
[45] Date of Patent: May 16, 1995

[54] APPARATUS FOR PRODUCING FINGERPRINT IMAGES WHICH ARE SUBSTANTIALLY FREE OF ARTIFACTS ATTRIBUTABLE TO MOISTURE ON THE FINGER BEING IMAGED

[75] Inventor: Thomas F. Sartor, Jr., Sunnyvale, Calif.

[73] Assignee: Indentix Incorporated, Sunnyvale, Calif.

[21] Appl. No.: 119,495

[22] Filed: Sep. 10, 1993

[51] Int. Cl.$^6$ .............................................. G06K 9/20
[52] U.S. Cl. ..................................................... 356/71
[58] Field of Search ...................... 356/71; 250/227.11, 250/227.32; 382/4, 5

[56] References Cited

U.S. PATENT DOCUMENTS

| | | | |
|---|---|---|---|
| 3,174,414 | 3/1965 | Myer | 95/1.1 |
| 3,527,535 | 9/1970 | Monroe | 356/71 |
| 3,619,060 | 11/1971 | Johnson | 356/71 |
| 3,702,731 | 11/1972 | Wood, Jr. | 355/18 |
| 3,947,128 | 3/1976 | Weinberger et al. | 356/71 |
| 3,975,711 | 8/1976 | McMahon | 340/146.3 E |
| 4,151,512 | 4/1979 | Riganati et al. | 340/146.3 E |
| 4,537,484 | 8/1985 | Fowler et al. | 354/62 |
| 4,681,435 | 7/1987 | Kubota et al. | 356/71 |
| 5,051,576 | 9/1991 | Schiller | 356/71 |

OTHER PUBLICATIONS

D. T. Follette, E. B. Hultmark & J. G. Jordon, "Direct Optical Input System for Fingerprint Verification," *IBM Technical Disclosure Bulletin*, vol. 16, No. 11, Apr. 1974, pp. 3572–3573.

*Primary Examiner*—Vincent P. McGraw
*Attorney, Agent, or Firm*—Limbach & Limbach

[57] ABSTRACT

An apparatus for imaging a finger so as to produce a fingerprint image free of artifacts created by moisture on the finger. An optical platen having a surface for receiving the finger to be imaged is illuminated by a light source. A light detector is provided for receiving light from the platen surface which is internally reflected at the surface. A fingerprint image is formed by light which is internally reflected at the regions intermediate the finger ridges and absorbed/dispersed where the ridges contact the surface, The observation angle of the detector is sufficiently large so that moisture on a person's fingers does not affect the light which is internally reflected at the surface and detected. The resultant fingerprint image is free of artifacts attributable to moisture.

5 Claims, 3 Drawing Sheets

APPARATUS FOR PRODUCING FINGERPRINT IMAGES WHICH ARE SUBSTANTIALLY FREE OF ARTIFACTS ATTRIBUTABLE TO MOISTURE ON THE FINGER BEING IMAGED

TECHNICAL FIELD

The present invention relates generally to apparatus for recording fingerprint images, and more particularly, to an apparatus which eliminates image artifacts which have been found to be attributable to moisture on the finger being imaged.

BACKGROUND OF THE INVENTION

Optical systems have been developed for imaging fingerprints directly from the contact of a person's finger with a platen or prism. Such systems provide a means of creating fingerprint images for purposes of storage, analysis, or printing. These systems also avoid the time consuming and messy process of obtaining fingerprints by using ink and rolling the inked fingers across a printing surface.

Typically, as shown in FIG. 1 which depicts the geometry of the platen/finger interface for a typical fingerprint imaging apparatus, a finger to be imaged 10 is placed on the upper surface of an optically transparent prism, referred to as a platen 12. The surface topography of finger 10 can be approximated by a series of ridges, R with intermediate valleys, V. The ridges of finger 10 contact platen 12 while the valleys do not and instead serve to form the boundaries of regions of air and/or moisture.

The finger to be imaged is illuminated by a light source (not shown) located below platen 12. Light from the light source is incident on the finger-receiving surface of the platen at an angle of incidence, $\theta_I$, measured with respect to a normal N to the platen surface. Light reflected from platen 12 is detected by an imaging system (not shown) which usually includes some form of a detector. The aperture of the imaging system determines which of the reflected light rays are detected. In this sense the orientation of the imaging system, i.e., the angle between the optical axis of the imaging system and the normal to the platen surface (referred to as the "observation angle") determines which rays of light reach the detector.

The components of a typical fingerprint imaging system are oriented so that the angle of observation is greater than the critical angle $\theta_{AP}$ for the interface between platen 12 and the air above the finger-receiving surface of platen 12, where the critical angle $\theta_{AP}$ is defined as the smallest angle of incidence for which light striking the platen/air interface is totally internally reflected within platen 12. The illumination source is then oriented so that the light rays it produces cover a range of incidence angles which includes the angle of observation of the imaging system. Since the angle of incidence is equal to the angle of reflectance, $\theta_R$, the range of angles of reflectance also includes the angle of observation of the imaging system.

The value of the critical angle at the interface between two materials depends on the index of refraction of those materials. In this case, it depends on the indices of refraction of the platen material and air, and is defined according to Snell's law as follows:

$$\theta_{AP} = \text{Arcsine } (N_A/N_P), \text{ where} \qquad (1)$$

$\theta_{AP}$ is the critical angle, $N_A$ is the index of refraction for air, and $N_P$ is the index of refraction for the optical platen. The index of refraction for air, $N_A$, is approximately 1 and the index of refraction of the platen material, $N_P$, is typically 1.491 for acrylic plastic. With these values, the critical angle $\theta_{AP}$ for the platen/air interface has a value of approximately 42 degrees.

As noted, the critical angle $\theta_{AP}$ for the platen/air interface, based on the actual index of refraction of the platen material, forms a lower bound on the angle of observation. This in turn provides a limit on the angles of incidence and reflection, and hence the orientation of the illumination source. A further constraint arises because there is an incentive to observe the image at the smallest practical angle of observation (corresponding to the smallest practical angle of reflection, $\theta_R$), as this reduces distortion due to image tilting. Thus, the angle of observation is typically chosen to be close to, but greater than the critical angle.

As indicated, by appropriate selection of the angles of incidence and observation, it can be arranged so that at those locations where air contacts the platen surface, i.e., in the valley regions V of finger 10, light is totally internally reflected. By way of example, light ray 14 is incident on platen 12 at an angle of incidence of $\theta_I$ with respect to the normal N to platen 12, where $\theta_I$ is in excess of the critical angle $\theta_{AP}$ for a platen/air interface. Therefore, light is totally internally reflected at the platen/air interface with the angle of incidence $\theta_I$ equaling the angle of reflection $\theta_R$. In this case, light is not reflected off of the valley regions V of finger 10 because it is not refracted through the platen/air interface and thus is not incident on finger 10. The resulting image of the valley regions of finger 10 is bright since the incident light is reflected at the platen/air interface.

In those locations where the ridges R of finger 10 contact platen 12, total internal reflection does not occur. Instead, what is termed "frustrated total internal reflection" is found to occur. This is because the index of refraction of finger 10 is larger than that of air, so that the angle of incidence no longer corresponds to the critical angle for the relevant interface. As shown by light ray 16, which is incident on the surface of platen 12 at a location where a ridge R of finger 10 is contacting platen 12, the light is now refracted through the platen/finger interface where it is partially absorbed and partially dispersed upon contact with finger 10. In this case only a small fraction of the incident light is reflected back to a detector at an angle of reflection $\theta_R$ equal to the angle of incidence $\theta_I$, and therefore the ridges R of finger 10 contribute a dark component to the image of the fingerprint.

When the reflected light is observed at an angle greater than the critical angle $\theta_{AP}$ (i.e., the angle of observation is greater than the critical angle), an image of the fingerprint can be formed on a detector. As mentioned, the image includes bright regions which correspond to the valleys V of finger 10 and darker regions which correspond to the ridges R of finger 10. After detection, the fingerprint image can be permanently recorded for storage and/or further analysis.

Alternatively, it is possible to produce a fingerprint image which is of the opposite polarity of that described above. Such an image would be one in which the ridges R of finger 10 contributed a bright region, while the valleys V contributed a dark region. To obtain such an image the light source used to illuminate finger 10 is placed along the normal N to platen 12, i.e., at an angle of incidence of approximately 0 degrees. Since this angle of incidence is less than the critical angle for a platen/air interface, a substantial amount of the incident light is refracted through the platen/air interface and is reflected in a diffuse manner off of finger 10. If the reflected light is observed at an angle greater than the critical angle for the platen/air interface, very little reflected light is detected. However, a small amount of the light which strikes the ridges R of finger 10 is reflected along the angle of observation due to dispersion. Accordingly, a fingerprint image is formed in which the ridges R of finger 10 are comparatively brighter than the valleys V.

It has been found that fingerprint image artifacts sometimes occur which lead to a degradation of the image. These artifacts take the form of some type of bridging in the image between adjacent ridges R of a person's finger. The problem is especially pronounced for individuals that have particularly moist hands, and thus appears to be related to the presence of moisture on the fingers of the person whose fingerprint is being taken. The bridging artifact can be reduced by drying the hands or by cleaning the hands with a solvent. However, it has been found that such drying and cleaning have a tendency to interfere with the formation of proper contact between the finger ridges and the platen surface, thereby preventing the formation of a clear image of the fingerprint.

It has been suggested to use a blow dryer to blow heated air onto the fingers of the person whose fingerprint is being imaged in order to reduce the degradation of the image caused by the presence of moisture. It has also been suggested to use a heated platen for the same purpose. However, both of these proposed solutions to the problem require the use of additional elements in the fingerprinting apparatus, and neither appears to work completely satisfactorily for persons who sweat profusely.

What is desired is an apparatus for obtaining fingerprints which is less sensitive to the presence of moisture on a person's finger and is capable of producing high quality fingerprint images in the presence of moisture.

SUMMARY OF THE INVENTION

The present invention is directed to an apparatus for imaging a fingerprint which is capable of producing high quality images in the presence of moisture on a person's fingers. The fingerprint imaging apparatus includes an optical platen having a surface for receiving a finger to be imaged and a light source for illuminating the platen. The apparatus further includes light detector means for detecting light originating from the light source which is reflected from the platen surface. The detected light from the platen surface forms an image of the fingerprint.

The light detector means and the platen are positioned relative to one another such that the light detector means detects light having an angle with respect to a normal to the platen surface which is greater than the critical angle corresponding to a platen/water interface, but less than the critical angle corresponding to a platen/finger interface. As a consequence, incident light is internally reflected at the platen/water interface corresponding to the valleys of the finger being imaged, but not at the interface between the platen and the ridges of the finger being imaged. This enhances the contrast between the parts of the image formed by the ridge regions and the valley regions of the finger. Artifacts due to the presence of moisture on the finger, such as bridging between the finger ridges, are thus eliminated.

The present invention overcomes the above-noted limitations of conventional fingerprint imaging techniques. A print image can be obtained which is free of the artifacts typically encountered when the fingers being imaged are moist. These and other advantages of the present invention will be apparent to those skilled in the art upon a reading of the following Detailed Description of the Preferred Embodiment of the Invention together with the drawings.

DETAILED DESCRIPTION OF THE PREFERRED EMBODIMENT

Figure 1:
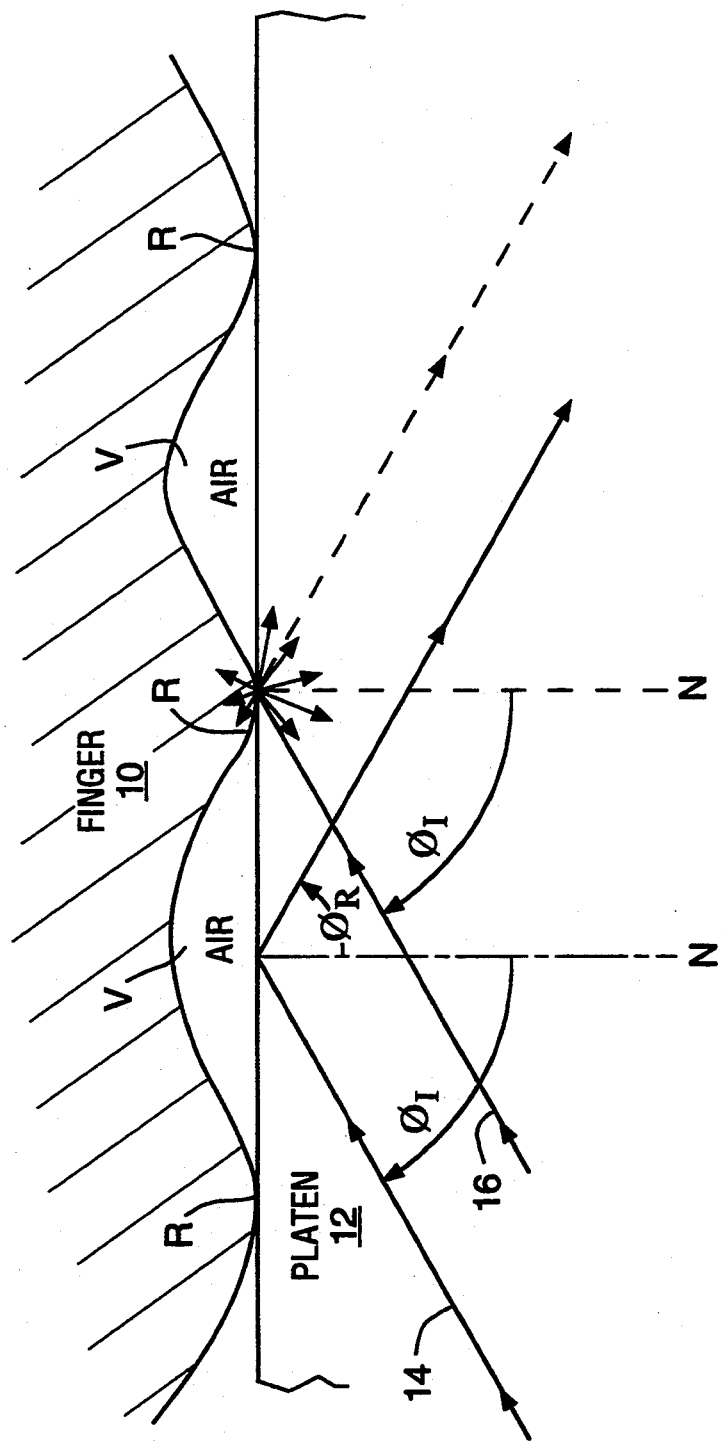
FIG. 1 is a cross-sectional diagram of a finger-receiving platen and a finger being imaged on the platen and shows the geometry of the platen/finger interface and the concepts upon which a conventional fingerprint imaging apparatus is based.
Figure 2:
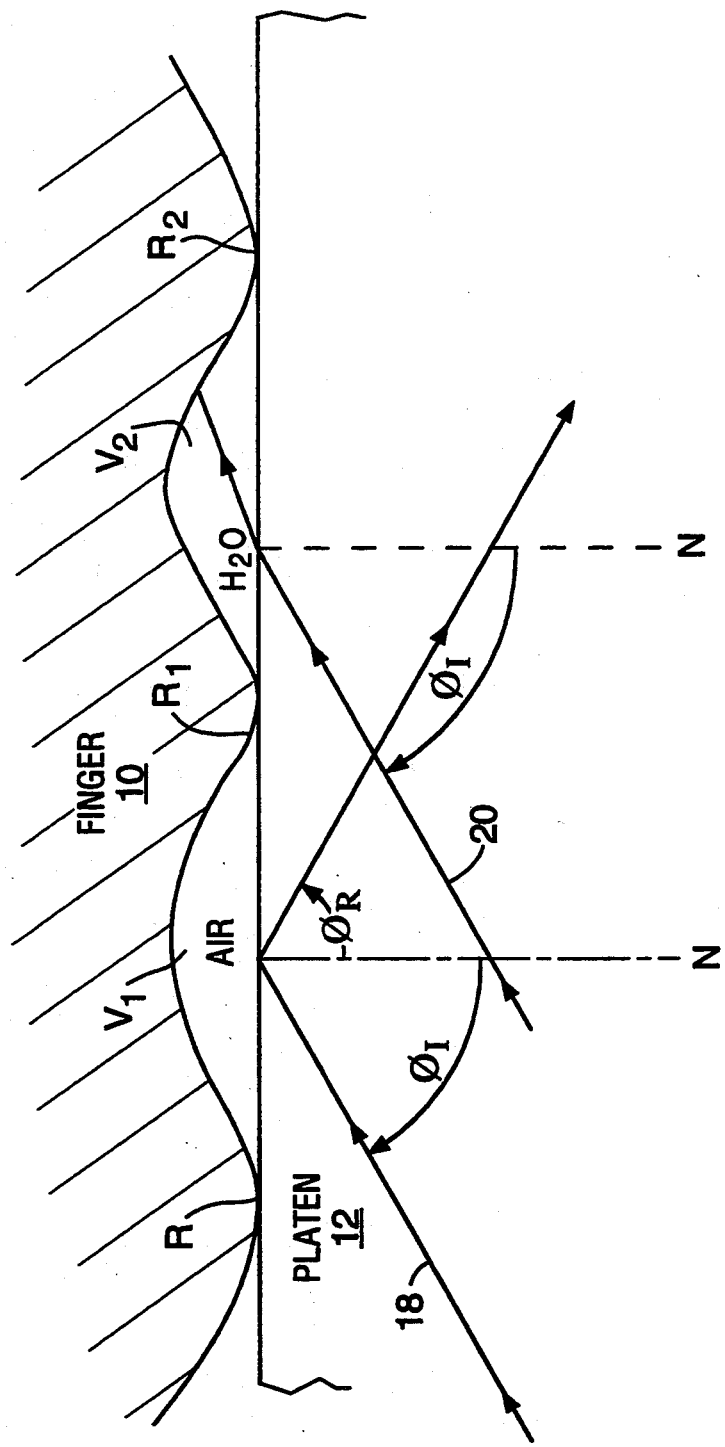
FIG. 2 is a cross-sectional diagram similar to that of FIG. 1 showing the manner in which image artifacts are created due to moisture present on the finger being imaged.

Referring again to the drawings, FIG. 2 shows a finger 10 to be imaged which is located on a platen 12 which is illuminated by a light source (not shown). Light ray 18 is incident at an angle $\theta_I$ with respect to a normal N to platen 12. Angle $\theta_I$ is greater than the critical angle $\theta_{AP}$ for a platen/air interface. Light ray 18 strikes the platen surface at a location below valley $V_1$ of finger 10 and is totally internally reflected. A second light ray 20 is also incident at an angle $\theta_I$ which is greater than the critical angle $\theta_{AP}$. Light ray 20 is incident on the surface of platen 12 below a second valley $V_2$ which is bounded by finger ridges $R_1$ and $R_2$. However, valley $V_2$ is filled with moisture, usually as a result of perspiration.

The presence of moisture in valley $V_2$ can cause light ray 20 to be refracted rather than internally reflected. This can occur because the index of refraction for water is larger than that for air, so that the critical angle for a platen/air interface differs from that for a platen/water interface. Thus, light incident on a platen/water interface at an angle of incidence which is equal or close to the critical angle for a platen/air interface is not subject to total internal reflection, but is instead partially refracted. Light ray 20 may thus intercept finger 10 and be dispersed. In this case, valley $V_2$ is observed to be similar to a ridge and appears as an artifact in the form of a bridge or "blob" between ridges $R_1$ and $R_2$.

Platen 12 is typically formed from glass or some type of plastic. Typical platen materials and their respective indices of refraction are set forth in Table 1 below.

TABLE 1

| Material | Index |
|---|---|
| acrylic plastic | 1.491 |
| polycarbonate plastic | 1.586 |
| Crown glass (BK 7) | 1.517 |
| Flint glass (SF 2) | 1.648 |

By way of completeness, the index of refraction for water is approximately 1.33.

An index of refraction can also be associated with a person's fingers. The index of refraction (or more properly, the "effective" index) for fingers was measured by the inventor of the present invention for several individuals using platens formed from the materials listed in Table 1. The indices were measured by observing the angle at which total internal reflection starts to take place. This is sometimes referred to as the extinction angle. At this point, the fingerprint image disappears. The measured indices for fingers varied from 1.46 to 1.51, with some effects occurring down to an effective index of 1.44.

It has been found that the artifacts created by moisture can be eliminated by observing light reflected from the platen surface at an angle which is greater than the critical angle corresponding to a platen/water interface. It has further been found that the finger image remained of good quality if the observation was also made at an angle which was less than the effective critical angle for a platen/finger interface (so that some incident light is refracted through the interface and reflects off of the finger ridges). It has thus been found that an image of a fingerprint which is free of artifacts created by water can be produced if the observation is made at an angle greater than the critical angle for a platen/water interface but less than the critical angle for a platen/finger interface.

As noted, it is desirable to view a fingerprint image at as small an angle as possible to reduce distortion due to image tilting. This suggests that the critical angle should be made as small as possible, i.e., that the index of refraction of the platen should be made as large as possible. The desired observation angle can be made relatively small by using a platen material made of flint glass (SF 2), which has an index of refraction of 1.648. In this case, the critical angle for a platen/water interface will be 54 degrees. Assuming that the index of refraction associated with fingers is 1.44, the critical angle for a platen/finger interface is then 60.9 degrees.

Since the critical angle for a platen/water interface provides a lower limit for the angle of reflectance (so that moisture induced artifacts can be eliminated), and the critical angle for a platen/finger interface provides an upper limit for the angle of reflectance at which an image can be observed, the range allowed for the aforementioned system using a platen formed from flint glass is approximately 54 to 61 degrees. Considering a system with a numerical aperture of 0.025, the angle between the axial ray and the marginal ray is plus/minus 1 degree. If the system is operated at an observation angle of 58 degrees, then a variation of plus/minus 3 degrees over the field of view is allowed.

Figure 3:
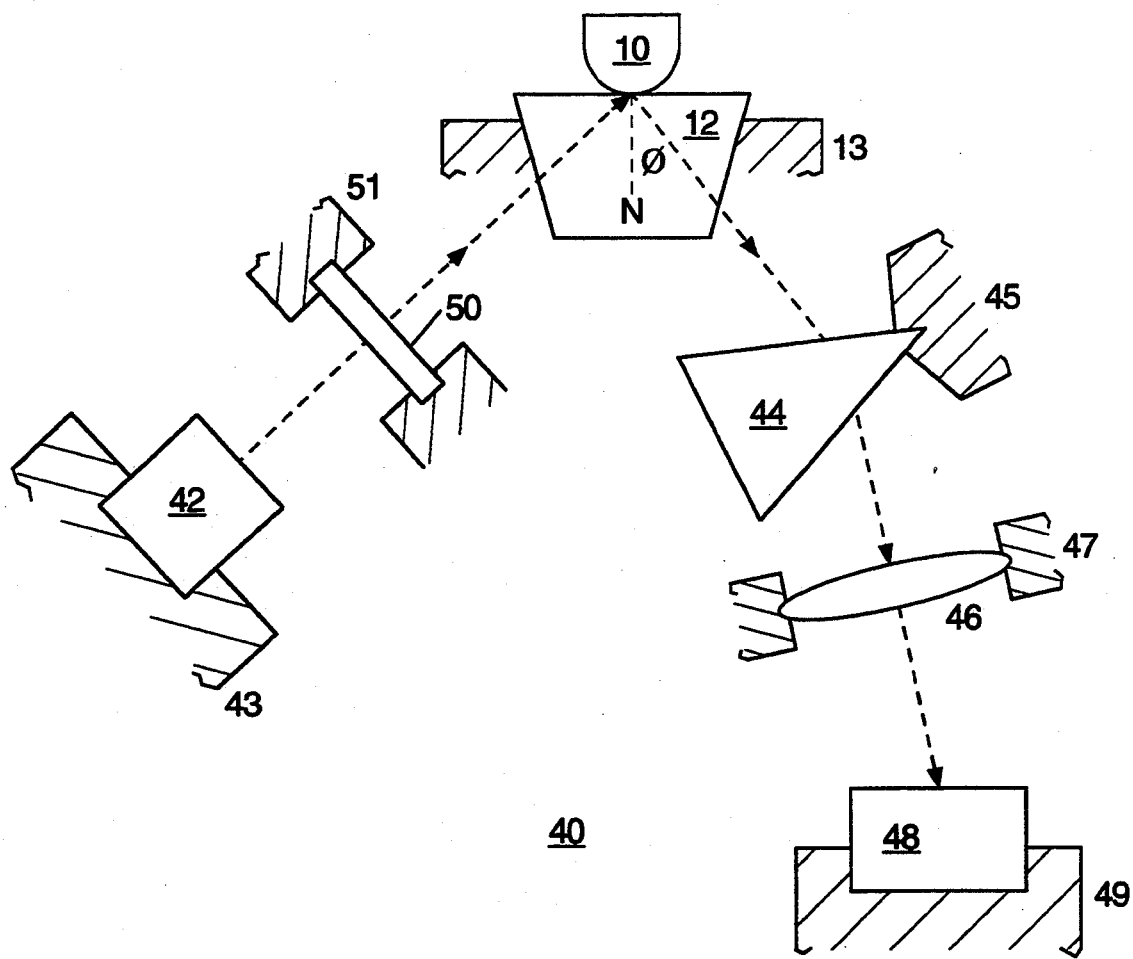
FIG. 3 is a simplified diagram of a fingerprint imaging apparatus of the present invention having a image detector positioned relative to the normal to the platen such that artifacts due to moisture on the finger being imaged are substantially eliminated.

Referring to FIG. 3, there is shown a simplified schematic diagram of a fingerprint imaging apparatus 40 of the present invention. Apparatus 40 includes a platen 12 having an upper surface for receiving a finger 10 to be imaged. Platen 12 often takes the form of an optically transparent prism and is preferably fabricated from an optical material having a relatively high index of refraction, such as flint glass (SF 2). An illuminator 42 which may consist of a light emitting diode (LED) light bar provides a source of light which illuminates the underside of finger 10 which is in contact with the surface of platen 12. Light from illuminator 42 may be directed through platen 12 by means of a Fresnel lens 50.

Light reflected from platen 12 is corrected by a prism 44 which compensates for the anamorphic distortion and defocusing of the edges of the fingerprint image introduced by viewing the plane of the fingerprint image at an angle. A lens 46 may be used to focus an image of the fingerprint obtained from the contact of finger 10 and platen 12 onto an array 48 which serves as a detector. Lens 46 is typically situated a sufficient distance from platen 12 so that a telocentric condition prevails, i.e., the principal rays from each point on platen 12 are approximately parallel. Detector 48 often takes the form of a charge coupled device (CCD) array.

In accordance with the present invention, correcting prism 44, lens 46, and detector 48 are positioned so that the detected light is that for which the angle of observation, $\theta$, with respect to the normal N to platen 12, is greater than the critical angle for a platen/water interface, but less than the critical angle for a platen/finger interface. Assuming that the platen is formed from flint glass (SF 2) and the light detector optics have a numerical aperture of 0.025 or less, angle $\theta$ should be selected to be approximately 58 degrees.

Platen 12, correcting prism 44, lens 46, and detector 48 of fingerprint imaging apparatus 40 of the present invention are held in their desired positions by mounting means 13, 45, 47, and 49, respectively. Additional mounting means 43 and 51 may be used to position light source 42 and Fresnel lens 50 in their respective positions. The mounting means are generally fixed, although they may allow minor adjustments to account for manufacturing tolerances. The described arrangement of the components of fingerprint imaging apparatus 40 permits moisture-induced artifacts in the fingerprint image to be substantially eliminated.

If desired, the video output of detector 48 (not shown) can then be converted to digital data which represent each pixel (picture element) of the fingerprint image. The pixels can then be stored or transferred to a processing unit for fingerprint verification or other desired operations.

Fingerprint imaging apparatus 40 of FIG. 3 is capable of producing fingerprint images which are substantially free of artifacts created by moisture. As result of the proper selection of the angle of observation, it is possible to avoid such artifacts even if the finger is very wet.

In summary, a first preferred embodiment of the invention of the present application is based on the following characteristics:

1. Selection of a platen material which has an index of refraction greater than that of a person's finger;
2. Observation of the fingerprint image at an angle of observation with respect to a normal to the platen surface which is greater than the critical angle corresponding to a platen/water interface, but less than the critical angle corresponding to a platen/finger interface; and
3. Selection and placement of an illumination source such that the distribution of reflection angles of the incident illumination upon reflection from the platen surface includes the angle of observation.

A second preferred embodiment of the present invention, corresponding to the production of a "bright image", is one in which the illumination source is positioned so that the angle of incidence is approximately normal to the platen (zero degrees). In this case the imaging system receives light diffused from the ridges of a person's fingers. To create a dark background for this "bright" image, light from the illumination source which has an angle of reflection equal to the angle of observation must be suppressed.

While the present invention has been described with reference to the specific embodiment and elements disclosed, it is understood that other, equivalent embodiments of the invention are possible, and that the practice of the invention is not intended to be limited solely to the embodiments specifically disclosed in this application.

I claim:

1. An apparatus for imaging a finger, comprising:
   an optical platen having a finger-receiving surface:
   a light source for illuminating the platen;
   light detector means for detecting light originating from the light source which is reflected from the finger-receiving surface of the platen, wherein the platen and light detector means are positioned relative to one another so that the light detector means detects light having an axis of propagation which is at an angle, $\theta$, relative to the platen surface normal, where the angle $\theta$ is greater than the critical angle corresponding to an interface of the optical platen and water, and less than the critical angle corresponding to an interface of the optical platen and the finger being imaged, and
   mounting means for positioning the optical platen and light detector means in their respective relative positions, whereby an image of a print of a finger positioned on the platen surface may be obtained substantially free of artifacts resulting from the presence of moisture on the finger.

2. The apparatus of claim 1 wherein an index of refraction of the optical platen is greater than 1.52.

3. The apparatus of claim 1 wherein the optical platen is glass having an index of refraction of 1.62 to 1.65 and the angle $\theta$ is 57 to 60 degrees.

4. The apparatus of 1, wherein light from the light source illuminating the platen is incident on the platen at an angle with respect to a normal to the platen surface which is greater than the critical angle corresponding to an interface of the optical platen and water, and less than the critical angle corresponding to an interface of the optical platen and the finger being imaged.

5. The apparatus of 1, wherein light from the light source illuminating the platen is incident on the platen at an angle with respect to a normal to the platen surface which is approximately equal to zero degrees.

* * * * *